US008277915B2

(12) United States Patent
Couturier

(10) Patent No.: US 8,277,915 B2
(45) Date of Patent: Oct. 2, 2012

(54) SELF-ADHERED AIR BARRIER MEMBRANE

(75) Inventor: Marysusan Couturier, Framingham, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/170,745

(22) Filed: Jun. 28, 2011

(65) Prior Publication Data

US 2011/0274865 A1 Nov. 10, 2011

Related U.S. Application Data

(63) Continuation of application No. PCT/US2010/022575, filed on Jan. 29, 2010.

(60) Provisional application No. 61/148,645, filed on Jan. 30, 2009.

(51) Int. Cl.
*B32B 9/00* (2006.01)
*B32B 5/12* (2006.01)

(52) U.S. Cl. .......... 428/40.1; 428/103; 428/202; 52/408

(58) Field of Classification Search .................. 428/40.1, 428/40.3, 42.1, 103, 195.1, 202; 52/108
See application file for complete search history.

(56) References Cited

U.S. PATENT DOCUMENTS 6,901,712 B2 * 6/2005 Lionel ............................ 52/408

FOREIGN PATENT DOCUMENTS

| WO | 2004/051019 | 6/2004 |
| WO | 2004/082932 | 9/2004 |

OTHER PUBLICATIONS

Form PCT/ISA/210, Siemsen, "International Search Report", PCT/US2010/022575, May 7, 2010, 5 pages.
Form PCT/ISA/237, Siemsen, "Written Opinion of the International Searching Authority", PCT/US2010/022575, May 7, 2010, 6 pages.
Technical Data Sheet, Blueskin® Breather Self-Adhesive Vapor Permeable Transition Air Barrier Membrane, Henry Company, May 26, 2006, 2 pages.

* cited by examiner

*Primary Examiner* — Patricia Nordmeyer
(74) *Attorney, Agent, or Firm* — Stephan P. Williams; Craig K. Leon

(57) ABSTRACT

Disclosed is a self-adhered, vapor permeable, air barrier membrane that is easy to install. The membrane has a Young's modulus of 3000 to 80,000 psi, most preferably 4000 to 15,000 psi, in the cross-direction and 5000 to 100,000 psi, most preferably 5000 to 20,000 psi, in the machine direction.

10 Claims, No Drawings

SELF-ADHERED AIR BARRIER MEMBRANE

CROSS-REFERENCE TO RELATED APPLICATIONS

This application is a continuation of application PCT/US2010/022575 filed on Jan. 29, 2010, which claims priority from application U.S. Ser. No. 61/148,645 filed on Jan. 30, 2009, the disclosures of which are incorporated herein by reference.

FIELD OF THE INVENTION

The present invention is directed to a self-adhered, vapor permeable, air barrier membrane that is easy to install.

BACKGROUND OF THE INVENTION

Water resistive barriers such as house wraps are can be effective in preventing the building enclosure from water such as wind driven rain, however, they are not necessarily effective air barriers. To be effective as an air barrier, materials must prevent the infiltration of air in addition to water. The use of air barriers has been increasing, due to their ability to improve durability, reduce energy and improve the indoor air quality. The Canadian NRC found that air movement is the major factor in transport of moisture through the building envelope. The transport of water vapor via air infiltration is 100 times more than that of vapor diffusion alone.

Air barriers can vary considerably in the degree of vapor permeance. Those barriers with a perm rating of <1 based on ASTM E96A are classified as impermeable. Perm ratings between 1 and 10 are semi-permeable, and those with perm ratings>10 are classified as permeable. Building design and location are two of the more important factors in determining which type of air barrier to use.

There are many forms of air barriers commercially available. One of the more widely recognized types are those which are mechanically fastened to the building, such as DuPont's Tyvek Commercial Wrap. This consists of a vapor permeable spun bond polyethylene film or membrane. To be an effective air barrier, mechanically fastened types must have every puncture, such as nail holes, and seams sealed. Having to seal every single nail or staple hole and seam is labor intensive and time consuming, but without such effort, they act as a water resistive barrier only. Another major drawback with the mechanically fastened types is lack of adhesion to the substrate. This free standing film type is easily torn from wind during installation or prior to covering the membrane with the building exterior. Also, given the stiffness of the material it is very noisy and difficult to handle in windy situations. The film may also tear due to negative pressure such as stack pressure. Thus, these mechanically fastened wraps have many drawbacks.

Fluid applied air barrier membranes, such as Grace Perm-A-Barrier VP and Perm-A-Barrier Liquid, are available and form an effective and durable air barrier. These types of barriers are fully adhered to the substrate which provides numerous benefits over the mechanical fastened type, such as ease of application, reduced tendency to tear under negative pressure, and no water infiltration. Fluid applied membranes can be either vapor permeable or impermeable. However, liquid spray applied product cannot be used in many situations, such as windy days, or close proximity to other buildings.

Self-adhered sheet air barrier membranes are available, such as Grace Perm-A-Barrier WM. This type of product is applied in peel and stick form and provide a very effective air barrier that seals nail and other punctures, bridges cracks and resists tearing. The majority of these types of sheets are composed of a polyethylene film and a very thick layer of asphaltic based adhesive. Given the nature of the adhesive, these types of membranes are impermeable to vapor.

There currently does not exist any contractor friendly, easy to install, vapor permeable air barrier membrane in sheet form. Blueskin Breather from Henry Corp. is a self-adhered vapor permeable transition membrane. This product is used mostly in applications transitioning from one product to another, such as a liquid applied to a flashing and is typically not used as a stand alone air barrier membrane. A particular drawback for this product is the membrane consists of a microporous laminated film which is very soft and weak. The membrane acts similar to that of a band aide and folds over onto itself causing wrinkles and sticking to itself. Thus, the product is not contractor friendly or easy to apply.

It is an object of the present invention to provide a self-adhered, vapor permeable, air barrier membrane that is easy to install.

SUMMARY OF THE INVENTION

The present invention embraces a self-adhered, vapor permeable, air barrier membrane that is easy to install. The membrane has a Young's modulus of 3000 to 80,000 psi, preferably 3000 to 50,000 psi, more preferably 3000 to 25,000 psi, in the cross-direction and 5000 to 100,000 psi, preferably 5000 to 50,000 psi, more preferably 5000 to 30,000 psi, in the machine direction.

DETAILED DESCRIPTION OF THE INVENTION

The self-adhered, vapor permeable, air barrier membrane will be in sheet form, typically having a width (cross-direction or XD) in the range of about 30 to 250 cm, more typically about 60 to 160 cm, and a length (machine direction or MD) of about 5 to 80 m, more typically about 15 to 40 m, and is rolled up into a roll. The membrane comprises a vapor permeable, spun-bond, non-woven polyolefin fabric sheet coated (or partially coated) on one side (i.e., on one major face) with a pressure sensitive adhesive and having a removable release sheet on the adhesive. The release sheet is removed prior to applying the membrane to a building substrate.

Vapor permeable, spun-bond, non-woven polyolefin fabric sheets are well-known and commercially available. They are typically made of polyethylene and/or polypropylene. The process of making a spun bond, non-woven polyolefin fabric sheet vapor permeable is also well known. Mukhopadhyay (Journal of Industrial Textiles 2008:37:225) provides a comprehensive review on designing waterproof breathable fabrics. The process of making a spun-bond vapor permeable membrane which meets air barrier requirements as described in ASTM E2179 is also well known to those skilled in the art. The fabric sheets utilized in the present invention provide both water and air resistance barriers as defined by AC 38 (ICC-ES) and ASTM E 2179. The vapor permeance is greater than 10 perms, more preferably greater than 15 perms, and most preferably greater than 20 perms (ASTM E96A at 75° F.). It is, thus, a straightforward matter to select or fabricate a spun-bond, non-woven polyolefin fabric sheet that meets the aforementioned criteria for air and water resistance as well as vapor permeability.

The fabric sheet is coated or partially coated on one side with a pressure sensitive adhesive. Any pressure sensitive adhesive currently used to adhere membranes to building substrates may be used. These include both vapor permeable and vapor impermeable pressure sensitive adhesives. An example of the latter is a rubber modified asphalt (bitumen) pressure sensitive adhesive or a synthetic rubber pressure sensitive adhesive. All of such pressure sensitive adhesives are well known in the art. If a vapor permeable pressure sensitive adhesive is used, the fabric sheet may be completely coated on one side. If a vapor impermeable pressure sensitive adhesive is used, then the fabric sheet may be only partially coated with adhesive, typically in the range of about 20-85%, more typically about 30-80%, most typically 40-70%, of the surface area of the sheet. In other words, at least 15-80%, preferably 20-70%, most preferably 30-60%, of the surface area of the fabric sheet should be adhesive-free in order to maintain sufficient vapor permeability of the membrane. Partial coatings of adhesive may be applied in a random fashion or in a specific pattern. Such partial coatings are described, for example, in U.S. Pat. Nos. 3,039,893, 3,426,754, 5,374,477, 5,593,771, 5,895,301, 6,495,229, and 6,901,712.

Ease of application of the membrane is related to the mechanical properties of the membrane. Membranes that are too stiff will tear too easily, will not be compliant, will be difficult to handle in windy applications, and can attenuate the wind causing loud noises. Membranes that are too weak can be very difficult to handle and install. They will tend to roll over onto themselves in high wind situations and cause wrinkles, which will become a source of air and water infiltration. Young's modulus is a quantitative way of measuring the stiffness or weakness of materials. It has now been determined that membranes with a Young's modulus of 3000 to 80,000 psi, preferably 3000 (ideally 3800) to 50,000 psi, more preferably 3000 to 25,000 psi, most preferably 4000 to 15,000 psi, in the cross-direction and 5000 to 100,000 psi, preferably 5000 (ideally 6000) to 50,000 psi, more preferably 5000 to 30,000 psi, most preferably 5000 to 20,000 psi, in the machine direction. Young's modulus is measured according to ASTM D882@75° F. and crosshead speed of 20"/min.

Several samples of spun-bonded vapor permeable membranes were obtained and tested for air permeance (lab modified ASTM E2178) and vapor permeability (ASTM E96A) at 75° F.

| Membrane | Air permeance, cfm/ft² | Perms |
|---|---|---|
| Tyvek Comm Wrap (DuPont) | 0.0009 | 23 |
| Tyvek Housewrap (DuPont) | 0.0204 | 54 (reported) |
| Blueskin Breather* (Henry) | 0.0023 | 37 |
| Dow Weathermate Plus | 0.00074 | 7 (reported) |
| Fiberweb Typar | 0.00074 | 12 (reported) |
| Pactive Green Guard | >0.08 | 10 (reported) |
| Axar TA (Altex) | | 75 |
| Axar TL (Altex) | Side A; 0.0070 Side B 0.00365 | 37 |
| Euro-Top 1400 (Blowitex) | 0.00487 | 76 |
| Euro-Top 1800 (Blowitex) | 0.0029 | |
| VLC 510 (Tredegar) | 0.00077 | 29 |

*Partially coated with adhesive

The acceptable air barrier requirement is <0.004 cfm/ft²@75 Pa. As seen, not all spun woven fabrics can be considered to be air barriers. One membrane had directional performance, perhaps due to the direction of the needle punching. The requirement for acceptable vapor permeance is >10 perms. However, since the fabric sheet will be partially covered with adhesive, the initial vapor permeance of the fabric will need to be >10 perms, preferably, >20 perms prior to coating with adhesive.

Three of the above fabrics were evaluated for vapor permeability after applying a random partial coating of pressure sensitive adhesive via hot melt application using a roll coat process to a coating weight of 100 g/m². As can be seen, all of them had acceptable permeance.

| Membrane w/partial adhesive coating | Perms |
|---|---|
| A: Axar TA w/psa | 60 |
| B: Euro-Top 1400 w/psa | 49 |
| C: VLC 510 w/psa | 26 |

To quantify ease of installation, the Young's modulus of various membranes, prior to addition of pressure sensitive adhesive (psa), was tested in accordance with ASTM D882@75 F and crosshead speed of 20"/min. The average values (standard deviation approximately ±10%) are given below.

| | Young's Modulus psi* | |
|---|---|---|
| Membrane of invention | XD | MD |
| A: Axar TA w/psa | 4592 | 8391 |
| B: Axar TL w/psa | 7394 | 7783 |
| C: Euro-Top 1400 w/psa | 6478 | 10734 |
| D: Euro-Top 1800 w/psa | not measured | not measured |
| E: VLC 510 w/psa | 5395 | 10674 |
| F: Fiberweb Typar w/psa | 17611 | 19649 |
| Comparative Membrane | | |
| Blueskin Breather | 2708 | 4668 |
| Tyvek Comm wrap (no psa) | 86782 | 121274 |
| Tyvek Housewrap (no psa) | 61651 | 77292 |

*Average of five samples (std. dev. approx. ±10%)

It was determined that samples according to the present invention (i.e., A to F above), with a Young's modulus within the range described above, have very good ease of application properties with respect to adhesion, cutting, wrinkling, thickness, stiffness, resistance to tearing, look and feel. Other samples outside the modulus range of the present invention are considered to have poor ease of application, in many cases tearing too easily or being too stiff to handle easily.

The invention claimed is:

1. A self-adhered, vapor permeable, air barrier membrane comprising a vapor permeable, spun-bond, non-woven polyolefin sheet coated or partially coated with a pressure sensitive adhesive and having a removable release sheet on the adhesive, wherein the membrane has a Young's modulus of 4000 to 15,000 psi in the cross-direction and 5000 to 20,000 psi in the machine direction, and has a vapor permeance greater than 15 perms (ASTM E96A at 75° F.).

2. The air barrier membrane of claim 1 having an industry acceptable water and air resistance as defined by AC 38 (ICC-ES) and ASTM E 2179.

3. The air barrier membrane of claim 1 having an air resistance of less than 0.004 cfm/ft² at 75 Pa.

4. The air barrier membrane of claim 3 wherein said polyolefin sheet is partially coated with said pressure sensitive adhesive.

5. The air barrier membrane of claim 4 having a vapor permeance greater than 20 perms.

6. The air barrier membrane of claim 1 wherein the pressure sensitive adhesive is a vapor permeable pressure sensitive adhesive.

7. The air barrier membrane of claim 6 wherein the polyolefin sheet is completely coated with the vapor permeable pressure sensitive adhesive.

8. The air barrier membrane of claim 1 wherein the pressure sensitive adhesive is a vapor impermeable pressure sensitive adhesive and wherein the polyolefin sheet is partially coated with the vapor impermeable pressure sensitive adhesive.

9. The air barrier membrane of claim 8 wherein the vapor permeable pressure sensitive adhesive coats about 30% to 80% of the surface area of the polyolefin sheet.

10. The air barrier membrane of claim 8 wherein the vapor permeable pressure sensitive adhesive coats about 40% to 70% of the surface area of the polyolefin sheet.

* * * * *